Patented June 7, 1927.

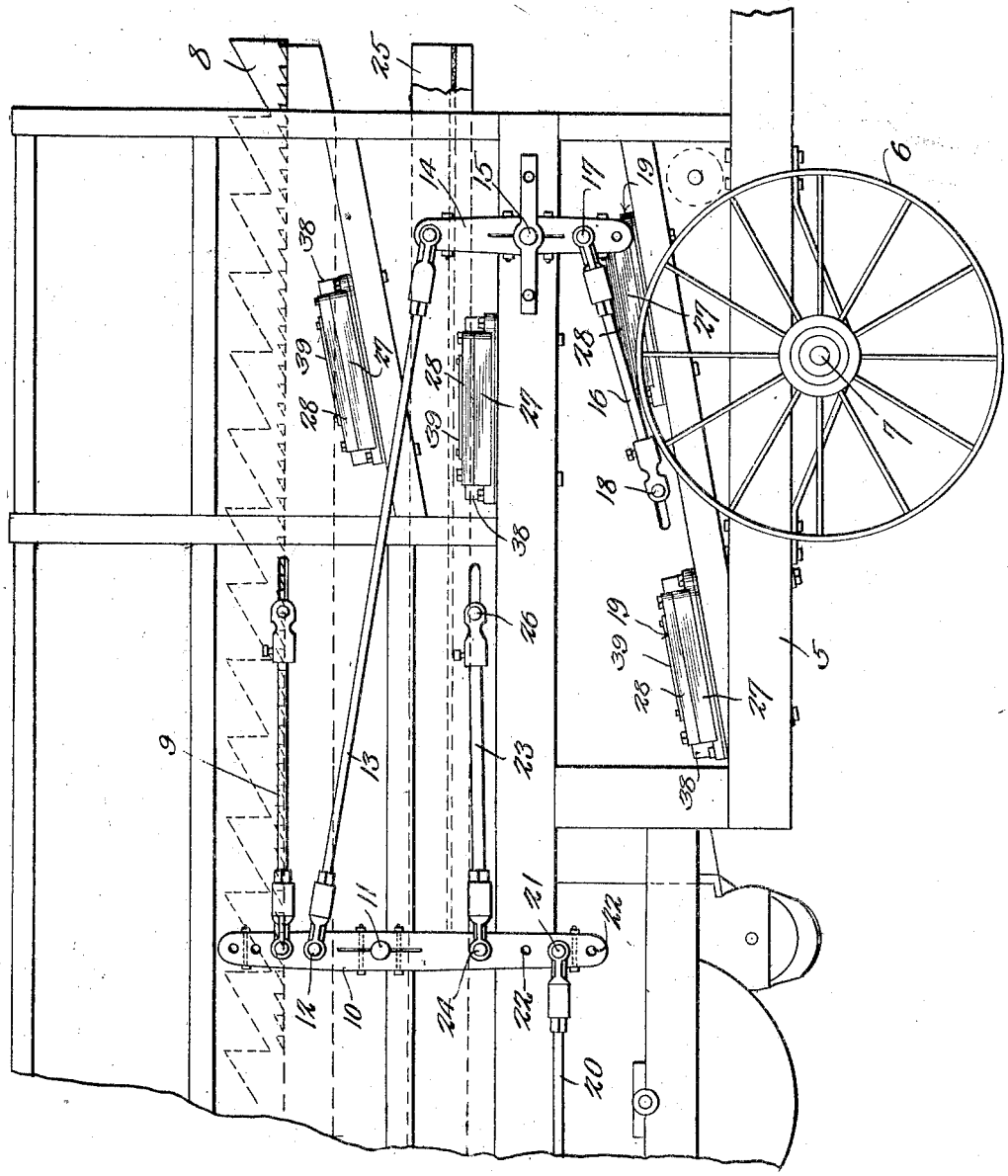

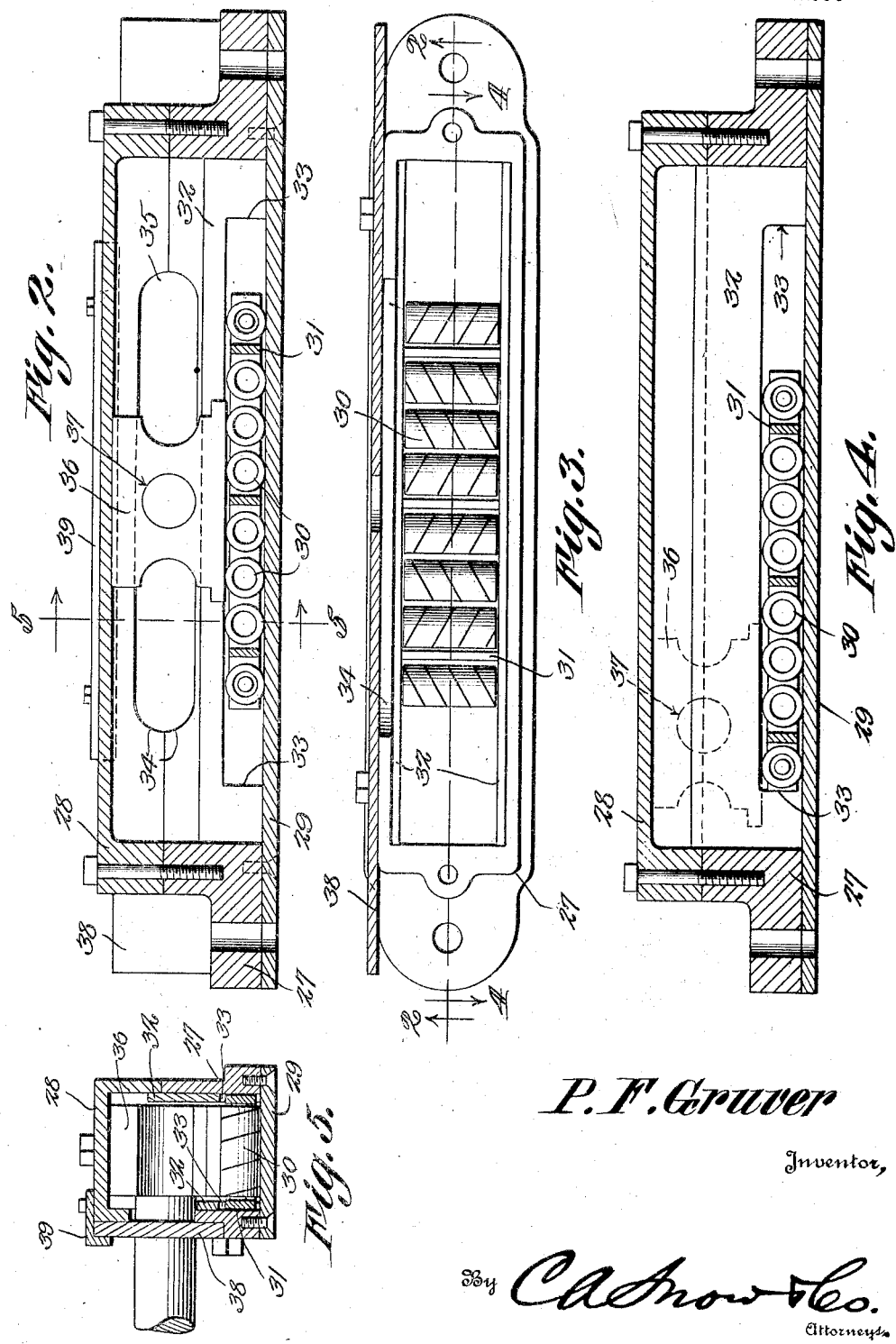

1,631,810

UNITED STATES PATENT OFFICE.

PERRY F. GRUVER, OF AMARILLO, TEXAS.

BEARING FOR GRAIN SEPARATORS.

Application filed February 5, 1925, Serial No. 7,086. Renewed April 28, 1927.

This invention has reference more particularly to thrashing machines, and aims to provide a novel form of bearing to be employed in connection with the supporting shafts of the movable elements of the machine.

The primary object of the invention is to provide a bearing especially adapted for use in connection with adjustable operating rods, whereby the throw of the rods will not in any way affect the bearing or the movement of the supporting shaft operating through the bearing.

Another important object of the invention is to provide a self adjusting bearing, the construction thereof being such as to reduce wear and friction between the movable elements thereof, to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view illustrating the rear end of a thrashing machine.

Figure 2 is a sectional view taken on line 2—2 of Figure 3, and illustrating the self-adjusting bearings.

Figure 3 is a plan view of the bearing, the cover thereof being removed.

Figure 4 is a sectional view taken on line 4—4 of Figure 3.

Figure 5 is a sectional view taken on line 5—5 of Figure 2.

Referring to the drawings in detail, the frame of the machine is indicated generally by the reference character 5, and as shown, is supported by the wheels 6 mounted on the axle 7 in the usual and well known manner.

The uppermost straw rack of the machine is indicated by the reference character 8 and is operated by means of the rod 9 that has connection with the vertical arm 10 which is pivotally supported at 11.

Connected with the arm 10 at 12 is a rod 13 that extends rearwardly and has pivotal connection with the arm 14 which is mounted on the shaft 15. The reference character 16 indicates a rod which has connection with the lower end of the arm 14 at 17, which rod connects with a movable pan at 18 to move the same, the movable pan having suitable shafts operating in the bearings 19.

Power is transmitted to the arm 10 through the rod 20 which has adjustable connection with the arm 10 through the medium of the pin 21 and openings 22, whereby the rod 20 may be moved vertically to adjust the throw of the arm 10. A rod indicated at 23 is pivotally connected to the arm 10 at 24, and has connection with the pan 25 at 26.

The bearing member forming the important feature of the invention comprises a sectional housing including the lower section 27 and the upper section 28, the lower section being supplied with a wear plate 29 on which the roller bearings 30 move. An elongated roller cage is indicated by the reference character 31 and is adapted to reciprocate within the lower section under the action of the shoe or shaft supporting member to be hereinafter more fully described.

Positioned within the lower section of the housing are lateral plates 32 which are formed with cut out portions defining shoulders 33 that are disposed adjacent to the ends of the housing so that movement of the cage will be restricted by the engagement of the cage with the shoulders 33 at the ends of its strokes.

The sections of the housing are formed with cut out portions 34 that define an elongated opening 35, when the sections are brought together, which elongated opening accommodates the supporting shaft that extends into the housing and allows the supporting shaft to reciprocate or move longitudinally of the housing to accomplish its purpose.

Operating in the housing and supporting the shaft, is a shoe 36 which is formed with an opening 37 to accommodate the shaft, the shoe being relatively wide and adapted to rest directly on the rollers 30 to move thereover. In order that the housing will be dust-proof, a plate 38 is provided, which plate is formed with an opening to accommodate the shaft that extends into the bearing, the plate being especially designed for closing the elongated opening 35. The upper edge of the plate 38 is held into contact with the housing by means of the angular plate 39 which holds the plate against lateral movement but permits of movement of the plate longitudinally of the housing.

From the foregoing it will be obvious that the housing may be filled with oil to the end that friction between the shaft and its bearing will be reduced to the minimum and that the bearing will compensate for the variation in the movement of the member supported thereby, eliminating the necessity of making an adjustment of the bearing when an adjustment of the operating rods has been made to change the throw of the pans or racks operated thereby.

I claim:—

1. A bearing for reciprocating shafts comprising an elongated housing having an elongated opening in one wall thereof, a roller cage within the housing, rollers within the cage, a shoe supported on the rollers, a shaft extending through the elongated opening and positioned within the shoe to move therewith, means disposed adjacent to the ends of the housing for restricting movement of the rollers and cage, and a plate movable with the shaft for closing the elongated opening.

2. A bearing for reciprocating shafts of separators, including an elongated housing having an elongated opening in one wall thereof, a roller cage within the housing, rollers within the cage, a shoe adapted to operate over the rollers, a shaft extending through the opening and having connection with the shoe to move therewith, and means carried by the shaft for normally closing the elongated opening.

In testimony that I claim the foregoing as my own, I have hereto affixed my signature.

PERRY F. GRUVER.